United States Patent [19]

Oto

[11] Patent Number: 5,604,746
[45] Date of Patent: Feb. 18, 1997

[54] DIGITAL DATA RECEIVER

[75] Inventor: Hideki Oto, Saitama-ken, Japan

[73] Assignee: Kabushiki Kaisha Toshiba, Kawasaki, Japan

[21] Appl. No.: 400,249

[22] Filed: Mar. 8, 1995

[30] Foreign Application Priority Data

Mar. 9, 1994 [JP] Japan .................................. 6-038046

[51] Int. Cl.$^6$ ................. H04J 1/00; H04B 1/06; H04B 1/26
[52] U.S. Cl. ................. 370/481; 375/326; 455/324; 455/266
[58] Field of Search ................. 375/344, 376, 375/334–336, 326, 340; 455/197.1, 182.1, 192.1, 3.2, 266, 325, 255, 256, 257, 258, 260; 370/19, 69.1, 120, 121, 122, 123

[56] References Cited

U.S. PATENT DOCUMENTS

| | | | |
|---|---|---|---|
| 4,795,986 | 1/1989 | Ceroni et al. | 375/344 |
| 5,260,671 | 11/1993 | Iso et al. | 375/344 |
| 5,289,506 | 2/1994 | Kitayama et al. | 375/344 |
| 5,303,404 | 4/1994 | Kivela | 455/266 |
| 5,375,146 | 12/1994 | Chalmers | 375/344 |
| 5,388,125 | 2/1995 | Toda et al. | 455/182.2 |
| 5,416,805 | 5/1995 | Tonello et al. | 375/344 |
| 5,422,889 | 6/1995 | Sevenhans e al. | 455/324 |
| 5,506,836 | 4/1996 | Ikeda et al. | 370/19 |
| 5,528,633 | 6/1996 | Halik et al. | 375/326 |

FOREIGN PATENT DOCUMENTS 59978 2/1993 Japan .

*Primary Examiner*—Wellington Chin
*Assistant Examiner*—Paul Loomis
*Attorney, Agent, or Firm*—Cushman Darby & Cushman, IP Group of Pillsbury Madison & Sutro, LLP

[57] ABSTRACT

A digital data receiver having a converter for frequency conversion of the input high frequency digital orthogonal modulation signal in a fixed intermediate frequency band, a demodulator for orthogonally demodulating an intermediate frequency signal output from the conversion signal based on a fixed frequency, and a controller for matching a frequency of the oscillation signal to a central frequency of the intermediate frequency band based on a frequency control signal generated to perform an orthogonal detection process by the demodulator. The central frequency of the oscillation signal is offset to correspond to a carrier frequency of the digital data orthogonal modulation signal in the state that a plurality of digital orthogonal modulation signal is frequency division multiplexed in the intermediate frequency band.

2 Claims, 5 Drawing Sheets

DIGITAL DATA RECEIVER

FIELD OF THE INVENTION

The present invention relates to a digital data receiver for use in digital transmission systems which transmit digitized information data such as image data and more particularly to, a digital data receiver which is suitable for receiving a plurality of digital data having different transmission rates.

BACKGROUND OF THE INVENTION

There are increasing tendencies in CATV (cable television) broadcasting systems or satellite television broadcasting systems, for instance, to use a digital transmission technique for transmitting image data in place of a conventional analog transmission technique. FIG. 1 shows a digital image data receiver in such a digital television transmission system using such a satellite. In FIG. 1 transmission signals from 11.7 GHz to 12.3 GHz, which are processed using a QPSK (quadrature phase shift keying) modulation, are transmitted from a satellite and then received by a satellite antenna 11. Groups of received signals are translated into 950 MHz to 1450 MHz by a frequency converter 12, an then amplified at an amplifier 13.

The received broadcasting signal output from the amplifier 13 is converted into an intermediate frequency signal in the 140 MHz band at a mixer 15 for mixing the received signal with a local oscillation signal from a variable local oscillation VCO (voltage controlled oscillator) 16, after being suppressed its image frequency regions at a preselector 14. The output from the mixer 15 is amplified at a variable gain amplifier 17 and then limited in a desirable band width at a BPF (band pass filter 18). The intermediate frequency signal is branched off on two paths at a separator 19. One of the intermediate frequency signals on the paths output from the separator 19 is supplied to a phase detector 20, and the other of it is supplied to another phase detector 21.

The phase detector 20 orthogonally detects an I-axis base-band signal by a phase detection on the input intermediate frequency signal based on an oscillation signal supplied from the VCO 22 through a separator 28. Also, the other phase detector 21 orthogonally detects a Q-axis base-band by the phase detection on the other intermediate frequency signal based on a 90° phase shift signal of the oscillation signal from the separator 28 through a 90° phase shifter 24.

Further, the I axis and Q axis base-band signals output from the phase detectors 20, 21 are each shaped their waveforms at LPFs (low pass filter) 25, 26, and then digitized at A/D (analog to digital) converters 27, 28. The digitized signals are supplied to a digital processor 29 which demodulates them into their corresponding data sequences together with a clock reproduction and a carrier reproduction. Thus, the demodulated data sequences are output through output terminals 30, 31. Further, the digital processor 29 generates a frequency control voltage signal for controlling the oscillation frequency of the VCO 22 which is used for the phase detection processings in the phase detectors 20, 21. The digital processor 29 also generates a control signal for controlling the gain of the amplifier 17.

Here, the band width of a satellite transponder is about 24 MHz to 40 MHz, and, in the analog video transmission, one transponder is typically occupied for the transmission of one video channel with an FM modulation. However, if a digital image compression technique is employed, it is possible to multiplex up to eight channels since one video channel is able to be transmitted by about 4 Mbps to 10 Mbps.

As such a multiplex system, there are an MCPC (Multi Channel Per Carrier) system which transmits a plurality of digital image data by multiplexing them on one carrier and an SCPC (Single Channel Per Carrier) system which transmits one channel image data by dividing it into a plurality of frequency bands. It is expected that these two multiplex systems will be used together in taking account of their features. And also it is expected that the analog transmission system will be used in the same satellite together with the multiplex systems.

The conventional digital image data receiver, as shown in FIG. 1, performs a channel tuning by varying the oscillation frequency of the variable frequency local oscillation VCO 16 in adjusting to the carrier central frequency of the received signal. In the tuning of the digital image data multiplexed in the MCPC system, there rises no problem since the central frequency of the tuned signal band, as indicated by a solid line in FIG. 2(a), agrees with the central frequency fc of the satellite transponder frequency band, as indicated by a broken line in the same FIG. 2(a).

However, in the SCPC system there are a plurality of data carriers D1 to D3, as shown by solid lines in FIG. 2(b) within the one transponder band, as shown by the broken line in the same FIG. 2(b) (three carriers are shown in the drawing's case). To select a desirable carrier from these data carriers D1 to D3, the oscillation frequency of the local oscillation variable VCO 16 must be offset so as to make the central frequency of the intermediate frequency signal output from the mixer 15 agree with the central frequency fd1, fd2 or fd3 of the desired carrier.

Accordingly when the left side data carrier D1 is selected, as shown in FIG. 2(c), a possibility of signal S1 of an adjacent channel entering within the intermediate frequency band of the data carrier D1 becomes higher. Further, it the SCPC system it employs a backoff for limiting the total power of the transponder lower than a prescribed power level to account for signal distortions. As a result, when the adjacent channel is the type of the MCPC system or the analog transmission system there also arises a level difference.

Accordingly, there is required a narrow band filter in the reception of signals in the SCPC system. However, it is technically difficult to provide such a 1 GHz band preselector 14 with a sufficiently narrow band characteristics. Thus, the mixer 15 is subject to the crosstalk of adjacent channel signals. To avoid such a crosstalk of the adjacent channel signals, a sophisticated intermodulation distortion must be performed based on the level difference between the desired and undesired signals. Although it is possible to make the band width of the BPF 18 narrower, in the reception of signals shared with signal in the MCPC system or signals with different data rates, it is required to change over many frequency bands, resulting in a sophisticated receiver circuit arrangement having increased size.

As described above, in the conventional digital data receiver, it is difficult to satisfactorily receive the whole digital data transmitted by mutually different multiplex systems such as a time division multiplex system or a frequency division multiplex system, at a simple construction.

SUMMARY OF THE INVENTION

It is, therefore, an object of the present invention is to remove the drawbacks in the conventional apparatus.

Another object of the present invention is to provide a digital data receiver which is able to reliably receive the various digital data transmitted by mutually different multiplex systems in simple construction.

In order to achieve the above objects, a digital data receiver according to one aspect of the present invention includes a converter for frequency conversion of the input high frequency digital orthogonal modulation signal in a fixed intermediate frequency band, a demodulator for orthogonally demodulating an intermediate frequency signal output from the conversion signal based on a fixed frequency, a controller for controlling to match a frequency of the oscillation signal to a central frequency of the intermediate frequency band based on a frequency control signal generated to perform an orthogonal detection process by the demodulator. Further, the central frequency of the oscillation signal is offset to correspond to a carrier frequency of the digital data orthogonal modulation signal in the state that a plurality of digital orthogonal modulation signal is frequency division multiplexed in the intermediate frequency band.

According to the construction as described above, since the digital data receiver makes the central frequency of the oscillation signal supplied to the demodulator be offset to agree with the carrier frequency of the digital orthogonal modulation signal, in the state that a plurality of digital orthogonal modulation signals are frequency-division-multiplexed in the intermediate frequency band, the digital data receiver is able to receive various digital data transmitted by mutually different multiplex systems in simple construction as well as at a highly reliance.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
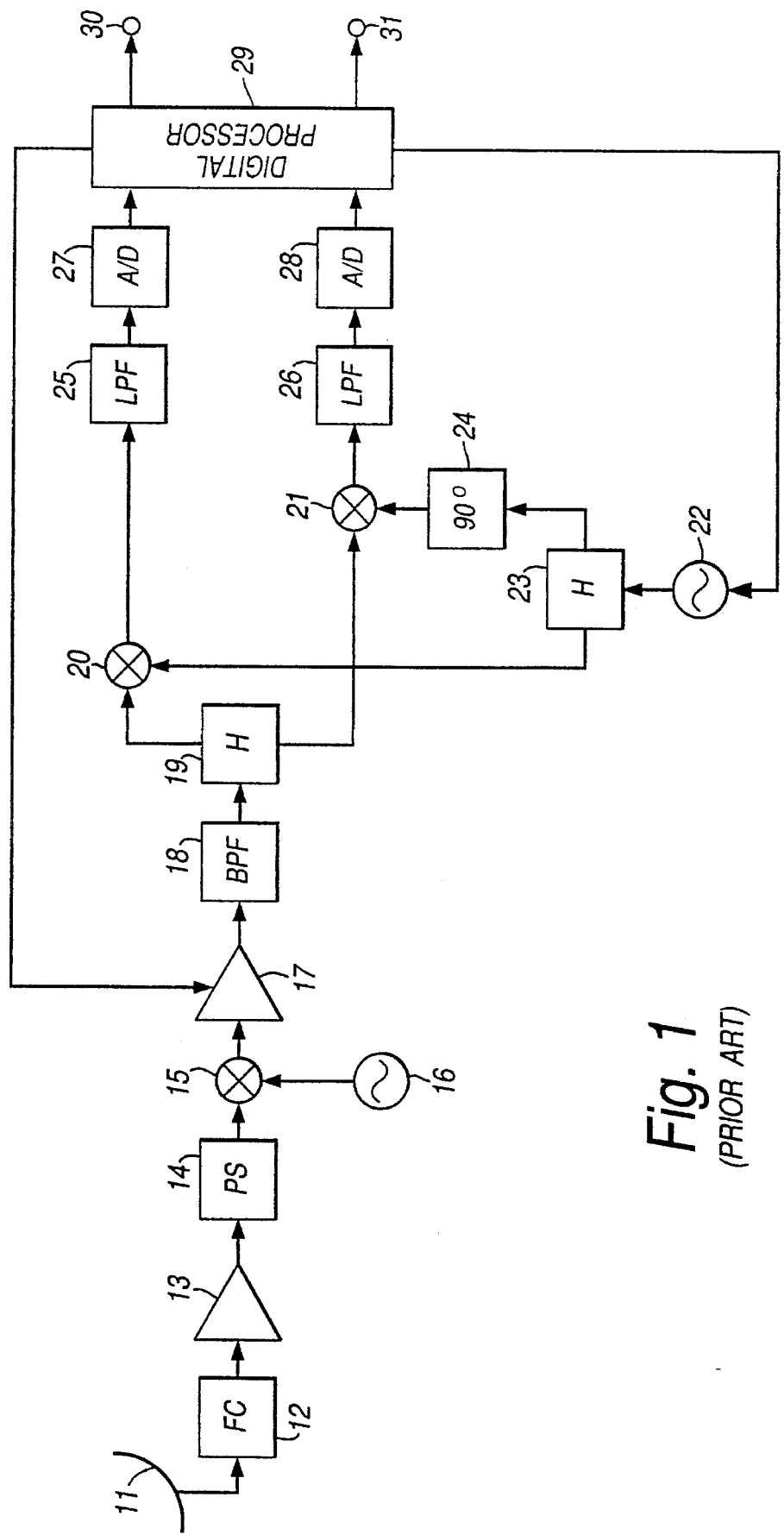
FIG. 1 is a block construction diagram showing a conventional digital data receiver.
Figure 2A:
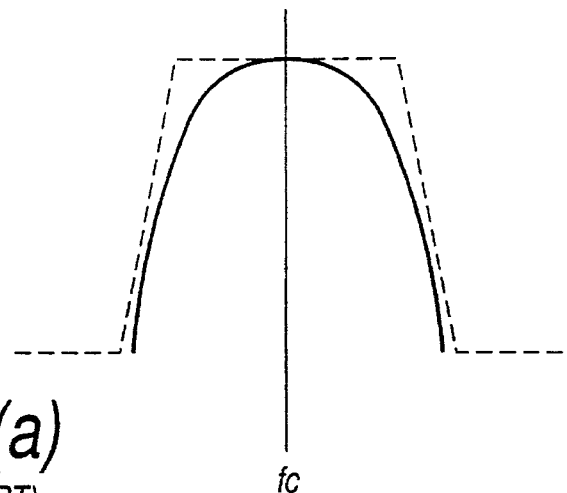
FIGS. 2(a), 2(b) and 2(c) are diagrams showing a problem of the conventional digital data receiver.
Figure 2B:
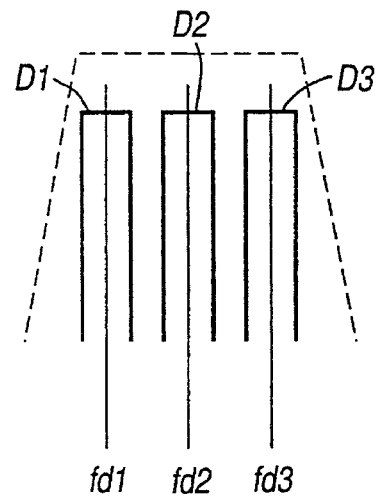
Figure 2C:
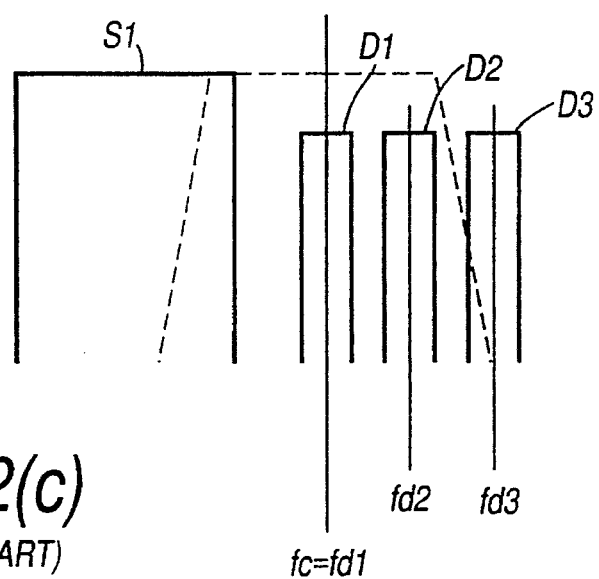
Figure 3:
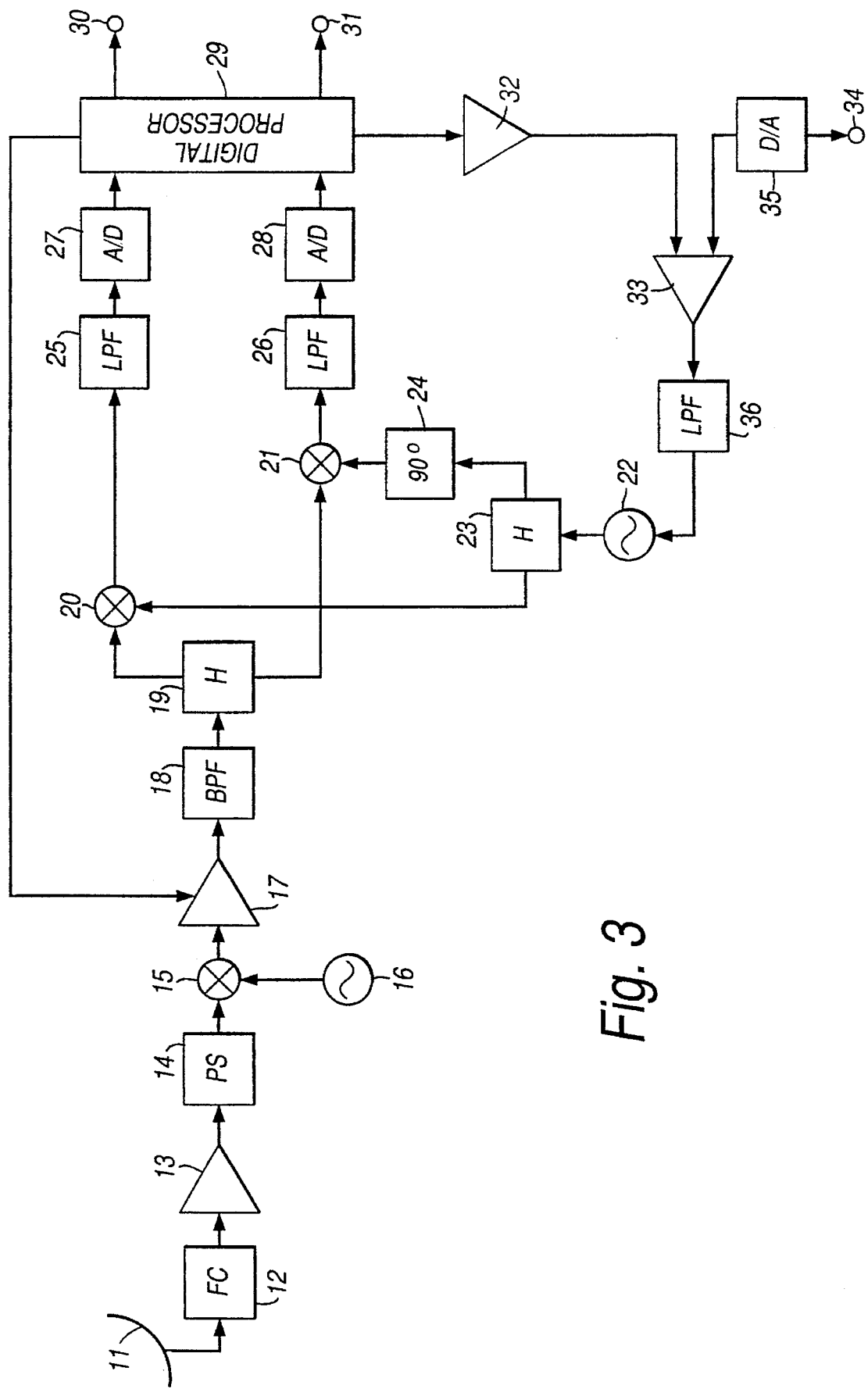
FIG. 3 is a block construction diagram showing one embodiment of the digital data receiver according to the present invention.

Referring now to FIGS. 3, 4(a), 4(b) and 5, some embodiments of the digital data receiver according to the present invention will be explained in detail hereinafter. In FIG. 3, the same components as those in FIG. 1 are assigned with the same reference numerals. Accordingly, the present invention is different from the conventional receiver in that the frequency control voltage output from the digital processor 29 is supplied to one input terminal of an adder 33 through a variable gain DC (direct current) amplifier 32.

Further, a reference numeral 34 in FIG. 3 denotes an input terminal, to which a frequency control data is supplied from a CPU (central processing unit) (not shown). The frequency control data supplied to the input terminal 34 is converted to a voltage signal in a D/A (digital/analog) converter 35, and then supplied to the other input terminal of the adder 33.

In the adder 33 the frequency control voltage supplied from the digital processor 29 is added with the control data supplied from the terminal 34 through the D/A converter 35. The voltage level signal obtained in the adder 33 is applied to the VCO 22 after undesired high frequency components are removed by an LPF 36.

In this case, the oscillation frequency of the VCO 22 in which its central frequency is determined by the frequency control data supplied from the CPU via the input terminal 34. Further, the oscillation frequency, i.e., the central frequency of the VCO 22 is modified in accordance with the output of the gain variable DC amplifier 32. Then the variable range of the oscillation frequency of the VCO 22 is defined by the output gain of the variable gain DC amplifier 32.

Figure 4A:
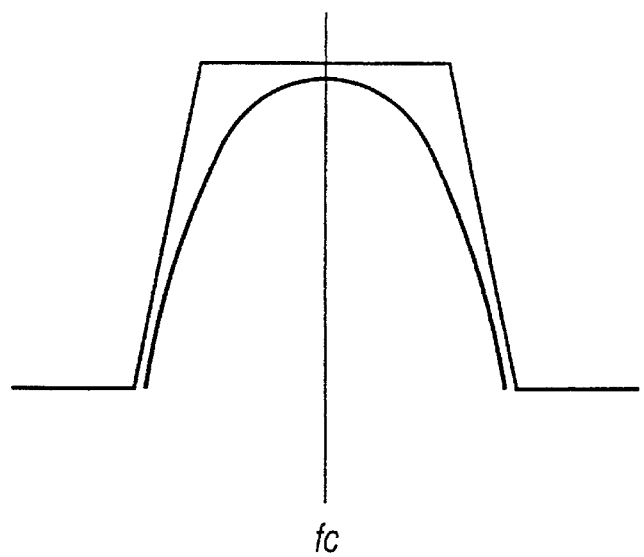
FIGS. 4(a) and 4(b) are diagrams showing an operation of the same embodiment.
Figure 4B:
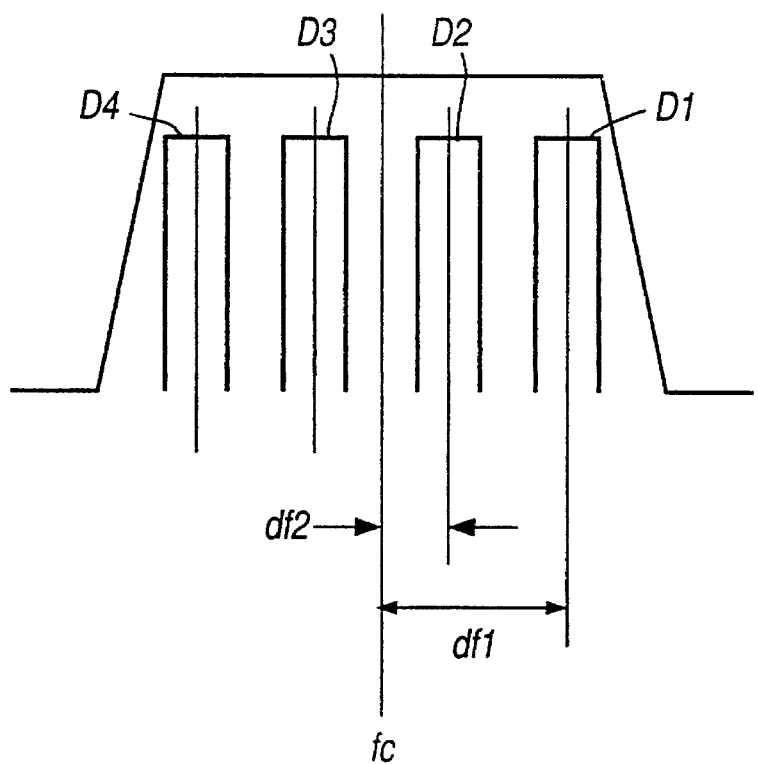

The operation of the present invention with the construction as described above will be explained hereinafter. In tuning the digital image data multiplexed in the MCPC system, since one frequency band of the modulated signal, as shown in FIG. 4(a), is selected, the central frequency of the VCO 22 is caused to agree with the central frequency fc of the intermediate frequency band. In contrast, in the SCPC system, there are a plurality of data carriers D1 to D4 within the intermediate frequency band, as shown in FIG. 4(b) (four carriers are shown in the drawing's case).

In order to exemplarily receive the data carrier D1, the central frequency of VCO 22 must only be shifted by df1 from the central frequency fc of the intermediate frequency band that corresponds to the frequency control data supplied from the CPU through the input terminal 34 when properly set. Further, while receiving the variable range of the oscillation frequency of the VCO 22 must only be set to a range that is protected so as not to pull-in adjacent data carriers. The setting of the variable range is embodied by changing the output gain of the variable gain DC amplifier 32 based on the frequency control voltage output from the digital processor 29.

It is also possible to commonly receive not only signals transmitted in the MCPC system and the SCPC system, but also signals with different transmission rates transmitted in the same SCPC system, by only varying the band widths of the LPFs 25, 26 and the feedback loop including the variable gain DC amplifier 32, in simple construction. In accordance with the tuning system of the present invention, since the input signal voltage in the circuit section on and after the pre-selector 14 is limited to the amount for one transponder, the input signal in the section has almost the same power regardless of the MCPC system or the SCPC system. It is therefore possible to provide a cost-effective and high performance digital data receiver, particularly since the desired performances in intermodulation distortion or the dynamic range derogated.

Figure 5:
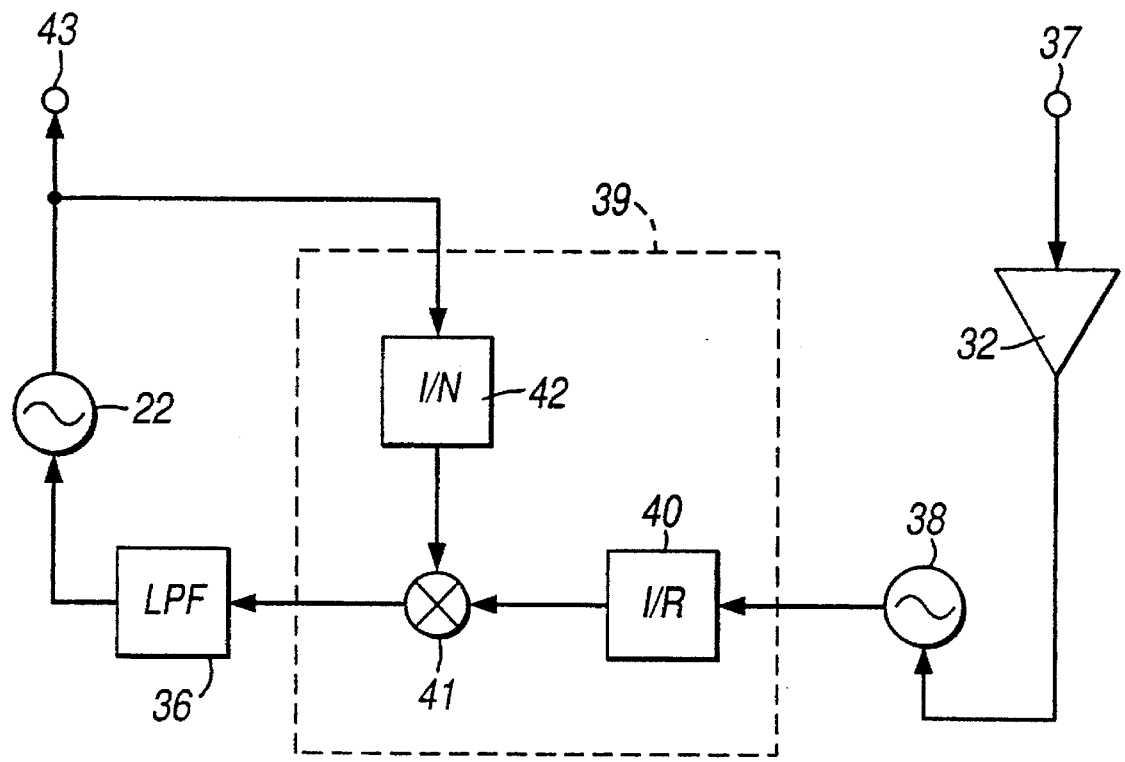
FIG. 5 is a block construction diagram showing the other embodiment of the present invention.

FIG. 5 shows another example for offsetting the central frequency of the VCO 22. In FIG. 5, the frequency control voltage supplied to an input terminal 37 is made available for the oscillation frequency control in a reference oscillator 38 constructed by a VCXO (voltage controlled crystal oscillator), an NCO (numerical controlled oscillator) or the like through a variable gain DC amplifier 32. Then the reference oscillation signal output from the reference oscillator 38 is divided at the frequency divider 40 constructing a phase-comparing circuit 39 and then supplied to a phase comparator 41.

The phase comparator 41 performs a phase comparison for the output of the frequency divider 40 and the signal which is divided in frequency from the local oscillation signal output from the VCO 22 in the factor of 1/N in the frequency divider 42. Thus, the phase comparator 41 outputs a signal that is responsive to the phase difference between the signals to the LPF 36 so as to control the oscillation frequency of the VCO 22. And, the local oscillation signal output from the VCO 22 is supplied to the separator 28 (see FIG. 8) through an output terminal 43.

The example shown in FIG. 5 operates to control the central frequency of the VCO 22 with a frequency synthesizer system. That is, the example controls the central frequency of the VCO 22 based on the phase difference between the frequency division signal with the factor of 1/N from the local oscillation signal output from the VCO 22 and the other frequency division signal with the factor of 1/R from the reference oscillation signal output from the reference oscillator 38. Here, the frequency dividing factors R and N are managed by the CPU so as to offset the central frequency easily.

Here, the present invention is not limited to the above embodiments, and can be adapted for many applications without departing from the principle of the present invention.

As described above, the present invention can provide an extremely preferable digital data receiver.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A digital data receiver comprising:

conversion means for converting a high frequency digital orthogonal modulation signal into a fixed intermediate frequency band;

demodulation means for performing an orthogonal demodulation of an intermediate frequency signal output from the conversion means based on a fixed frequency; and control means for matching a frequency of an oscillation signal with a central frequency of the intermediate frequency band based on a frequency control signal generated for performing an orthogonal detection processing by the demodulation means, and for offsetting the central frequency of the oscillation signal to correspond with a carrier frequency of a digital orthogonal modulation signal when a plurality of digital orthogonal modulation signals are frequency division multiplexed in the intermediate frequency band.

2. A digital data receiver comprising:

a converter for converting a high frequency digital orthogonal modulation signal into a fixed intermediate frequency band;

a demodulator for performing an orthogonal demodulation of an intermediate frequency signal output from the converter based on a fixed frequency; and a controller for matching a frequency of an oscillation signal with a central frequency of the intermediate frequency band based on a frequency control signal generated for performing an orthogonal detection processing by the demodulator, and for offsetting the central frequency of the oscillation signal to correspond with a carrier frequency of a digital orthogonal modulation signal when a plurality of digital orthogonal modulation signals are frequency division multiplexed in the intermediate frequency band.

\* \* \* \* \*